(12) United States Patent
Preissler

(10) Patent No.: US 8,064,285 B2
(45) Date of Patent: Nov. 22, 2011

(54) METHOD FOR FUNCTIONALLY TESTING AN ULTRASONIC SENSOR

(75) Inventor: Peter Preissler, Dorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 12/086,220

(22) PCT Filed: Nov. 16, 2006

(86) PCT No.: PCT/EP2006/068558
§ 371 (c)(1),
(2), (4) Date: Apr. 10, 2009

(87) PCT Pub. No.: WO2007/065779
PCT Pub. Date: Jun. 14, 2007

(65) Prior Publication Data
US 2009/0251990 A1    Oct. 8, 2009

(30) Foreign Application Priority Data
Dec. 5, 2005 (DE) .......................... 10 2005 057 973

(51) Int. Cl.
*H04B 17/00* (2006.01)
*G01S 3/80* (2006.01)

(52) U.S. Cl. ......................................................... 367/13

(58) Field of Classification Search .................... 367/13, 367/909; 73/1.82; 340/435, 436, 904
See application file for complete search history.

(56) References Cited

U.S. PATENT DOCUMENTS

| 5,160,927 | A  | * | 11/1992 | Cherry et al. ................ 367/909 |
| 5,235,315 | A  |   | 8/1993  | Cherry et al. |
| 6,040,765 | A  | * | 3/2000  | Cherry et al. ................ 340/436 |
| 2009/0207006 | A1 | * | 8/2009 | Richter et al. ................. 367/13 |
| 2009/0251990 | A1 | * | 10/2009 | Preissler ......................... 367/13 |

FOREIGN PATENT DOCUMENTS

| DE | 4338743 | 5/1995 |
| DE | 196 25 667 | 1/1998 |
| DE | 100 18 699 | 11/2000 |
| DE | 101 21 519 | 5/2002 |
| DE | 10 2005 013589 | 9/2006 |
| EP | 935765 | 5/1998 |
| EP | 1 453 348 | 9/2004 |
| WO | WO 2007065779 A1 * | 6/2007 |

* cited by examiner

*Primary Examiner* — Daniel Pihulic
(74) *Attorney, Agent, or Firm* — Kenyon & Kenyon LLP

(57) ABSTRACT

A method for functionally testing an ultrasonic sensor on a motor vehicle in which, in a test operating mode, an ultrasonic signal is emitted whose magnitude is large enough that under conventional conditions this ultrasonic signal is reflected by a ground surface in front of the vehicle and is received again. In this way, it can easily be determined that the ultrasonic sensor is functioning properly.

4 Claims, 2 Drawing Sheets

METHOD FOR FUNCTIONALLY TESTING AN ULTRASONIC SENSOR

FIELD OF THE INVENTION

The present invention relates to a method for functionally testing an ultrasonic sensor on a motor vehicle.

BACKGROUND INFORMATION

From German Patent Application No. DE 4338743, a method and a device are known for testing an ultrasonic sensor. For this purpose, a reflecting object is situated on the vehicle at a defined distance from the ultrasonic sensor, the magnitude of the amplitude reflected by this object being evaluated as a measure of the sensitivity of the ultrasonic sensor. From the propagation time of the ultrasonic signal to the stationary obstacle, it is also possible to determine the ambient temperature. A corresponding measurement is possible in those sensors in whose vicinity a corresponding obstacle is actually provided on the vehicle.

In addition, it is known that in the ultrasonic distance measurements the emitted signals are reflected not only by obstacles in the vicinity of the vehicle; a signal may also be reflected by the ground and sent back to the vehicle. In general, this effect is undesirable, because reflections from the roadway surface may be erroneously interpreted as indicating the presence of an obstacle in the vicinity of the vehicle. Thus, it can occur that a warning of an obstacle in the vicinity of a vehicle is outputted even though no obstacle is situated at the supposed location. Concerning this problem, from European Patent No. EP 935765 it is for example known to exclude such faulty detections by deliberately reducing the sensitivity for the possible distance of the ground echo. Correspondingly, the transmit signal can also be adapted in order to avoid false detections due to ground reflections.

SUMMARY OF THE INVENTION

The method according to the present invention for functionally testing an ultrasonic sensor, and a distance-measuring device according to the present invention, have the advantage that the emitted signal is adapted in such a way that in a test operating mode for the ultrasonic sensor, under conventional conditions an ultrasonic signal reflected by the ground can be acquired by the sensor itself or by another ultrasonic sensor on the vehicle. In this way, it is easily possible to test the functioning of the ultrasonic sensor, because a testing of the ultrasonic sensor, at least in order to find out whether it is sending out an ultrasonic signal, is possible even if no obstacle suitable for producing a reflected signal is situated in the vicinity of the vehicle. A test is possible even if the location of installation on the vehicle does not make it possible to use objects on the vehicle for a reflection of the ultrasonic signal.

"Under conventional conditions" should be understood here to mean that the vehicle is situated on a normal roadway surface. A ground reflection assumes first of all that such a ground surface is present in front of the vehicle. Thus, if the rear end, or the nose, of the vehicle, protrudes into, for example, shrubbery adjoining a parking place, these conventional conditions would not be present. The same holds for parking the vehicle in such a way that a ground surface is not present in front of the vehicle, e.g. a parking place situated next to a steep incline. In addition, the signal should be dimensioned so as to be strong enough that an ultrasonic signal reflected by the ground is acquired even under slightly unfavorable weather conditions, e.g. rain.

In contrast to the normal distance measurement, in which the emitted ultrasonic signal and/or the signal detection are selected such that, as far as possible, ground echoes are not detected at all, in the test mode the amplitude and/or duration of the emitted ultrasonic signal are increased or prolonged in such a way that a properly functioning ultrasonic sensor will also acquire a reflection of the ground echo. If functioning of the ultrasonic sensor has been established, the driver knows that he can generally rely on the sensor being used. The driver then also knows that he will be reliably warned of obstacles in the vicinity of the vehicle. If functioning of the ultrasonic sensor is not established, a warning is preferably outputted to the driver. The driver will then know that, e.g. as a result of dirt on the ultrasonic sensor or a defect in the sensor itself, he cannot rely on the outputting, if warranted, of a distance warning. He will then have to monitor the vicinity of the vehicle himself in order to avoid collisions. In some cases, it is also sufficient to clean the ultrasonic sensor of dirt or snow in order to restore functioning.

It is particularly advantageous not to begin measurements with the maximum value of the duration and/or amplitude of the emitted ultrasonic signal. This is because, in many cases, for a detection of the ground echo it will be sufficient to use a smaller amplitude or a shorter signal duration. If under these conditions the ground echo is already detected, functioning can already be established. For the case in which a ground echo is not detected, the amplitude can be increased or the signal duration can be made longer. Beginning with shorter signal durations can—if this signal duration is sufficient—make it possible to reduce the measurement time. This is advantageous particularly if the test measurement is carried out multiple times in succession in order to test whether the sensor is actually functioning reliably. In addition, the step-by-step increase of the gain also makes possible the acquisition of a gradation with respect to the determined sensitivity.

Besides simply detecting whether a ground echo is received, it is also advantageous to evaluate the magnitude of the amplitude of the received signal. If warranted, in this way a critical state of the ultrasonic sensor can be determined in the case in which a detection is present, but contamination by slush or snow may already be great enough to have a significant adverse effect on the sensor performance.

In addition, it is advantageous for the detection of the ground echo to increase a sensitivity level of the ultrasonic sensor for the time during which the ground echo is expected. This time window can be approximately determined from the geometry of the position of the sensor in relation to the roadway. Through the higher sensitivity, the detection of the ground echo can be improved. Because the important factor is in particular whether the sensor has at all sent out an echo signal that was reflected, a functional test of the ultrasonic sensor can thus also take place with surfaces that reflect an ultrasonic signal poorly, e.g. as a result of light overgrowth of vegetation.

DETAILED DESCRIPTION

Figure 1:
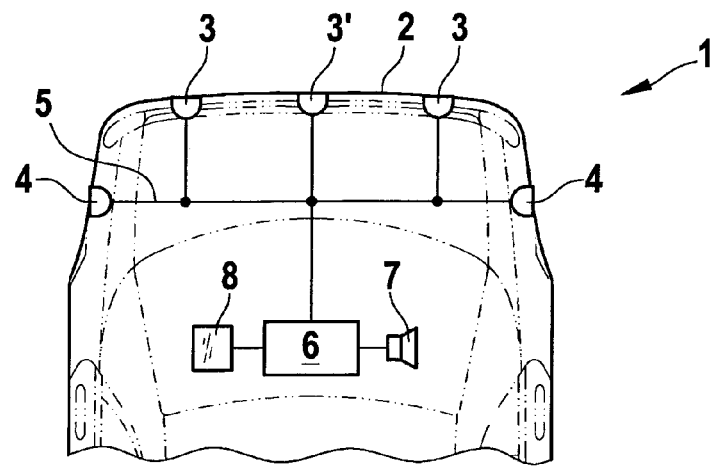
FIG. 1 shows a schematic view of a distance-measuring device according to the present invention, situated on a rear end of a vehicle.

FIG. 1 shows a rear end of a vehicle 1. On a rear edge 2 of the vehicle there are situated ultrasonic sensors 3, 3'. It is also possible to situate the sensors at a front side of a vehicle. In a preferred specific embodiment, ultrasonic sensors 4 can also be situated on the lateral corners of the vehicle. The ultrasonic sensors are connected to a control unit 6 for example via a bus system 5. Control unit 6 controls the emission of ultrasonic signals by ultrasonic sensors 3, 3', 4. The ultrasonic sensors each have for example a piezoelement that electrically excites a membrane to emit ultrasonic waves. The ultrasonic waves are reflected by an obstacle that may be situated in the vicinity of the vehicle and are reflected back to the ultrasonic sensors. Control unit 6 can switch ultrasonic sensors 3, 3', 4 into a receive mode. In receive mode, the reflected ultrasonic waves excite the membrane of the ultrasonic sensors to vibration. This vibration can be converted into electrical signals via the piezoelement. These electrical signals are evaluated either in ultrasonic sensors 3, 3', 4 or in control unit 6. This evaluation preferably takes place in such a way that an amplitude of the electrical signal is compared with a threshold value in a suitable manner. If the threshold value is exceeded, a reception of an ultrasonic signal is assumed. From the time at which the signal was sent and the time of the reception of the signal, the propagation time of the signal is determined. Taking into account the speed of sound, in this way it is possible to determine a distance of an obstacle between sensors 3, 4, and thus between the vehicle and an obstacle situated outside the vehicle. If this distance is less than a prespecified measure, e.g. one meter, an optical warning is outputted via a display unit 8 and/or an acoustic warning is outputted via a loudspeaker 7. In addition, according to the present invention control unit 6 is designed so as to carry out a test of ultrasonic sensors 3, 4. In a first specific embodiment, this test takes place when the vehicle is switched on. In another specific embodiment, the test can also be carried out when ultrasonic sensors 3, 4 are each activated, e.g. for a parking process that is to be carried out. In another specific embodiment, however, it is also possible to repeat the functional test at regular time intervals during a use of the ultrasonic sensors.

Figure 2:
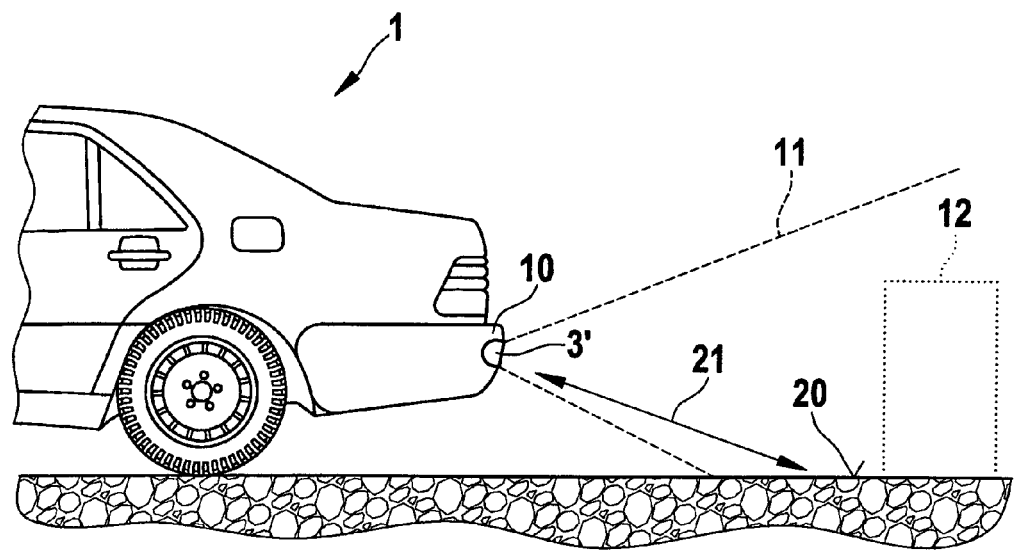
FIG. 2 shows a side view of the vehicle, above the base of the vehicle.

FIG. 2 shows vehicle 1, on whose bumper 10 ultrasonic sensors 3, 4 are situated. In FIG. 2, one of the ultrasonic sensors is shown as an example. Ultrasonic sensor 3' produces an approximately cone-shaped sound field 11. If an obstacle 12 (shown in dotted lines) were situated behind the vehicle, sound waves could be reflected from this obstacle to at least one of ultrasonic sensors 3. In the present case, however, there should be no obstacle situated behind the vehicle. However, the vehicle is standing on a ground surface 20. Due to the very flat angle of incidence of the ultrasound beam on ground surface 20, a large part of the incident ultrasonic waves are reflected away from vehicle 1. However, due to irregularities in ground surface 20, which are almost always present on standard roadway surfaces such as asphalt, a small part of the emitted ultrasonic signals according to arrow 21 are reflected from ground surface 20 back to ultrasonic sensor 3', or to one of the adjacent ultrasonic sensors 3. For a measurement e.g. of the distance to obstacle 12, the echoes from ground surface 20 are undesirable. In general, therefore, an ultrasonic signal is used whose amplitude is small enough, or whose signal duration is short enough, that the ultrasonic signal reflected by the ground surface does not disturb the measurement. However, according to the present invention, for the present test operation the emitted ultrasonic signal is provided with a amplitude that is great enough, or with a signal duration long enough, that the ultrasonic signal reflected by ground surface 20 according to arrow 21 is picked up by at least one of ultrasonic sensors 3'.

In a first specific embodiment, the measurement can take place in such a way that ultrasonic sensor 3' sends out an ultrasonic signal and is subsequently switched into a receive mode, so that it can itself receive the ultrasonic signal that it emitted. In another operating mode, the additional ultrasonic sensors 3 are switched into a receive operating mode in order to, receive the ultrasonic signal emitted by ultrasonic sensor 3'.

Figure 3:
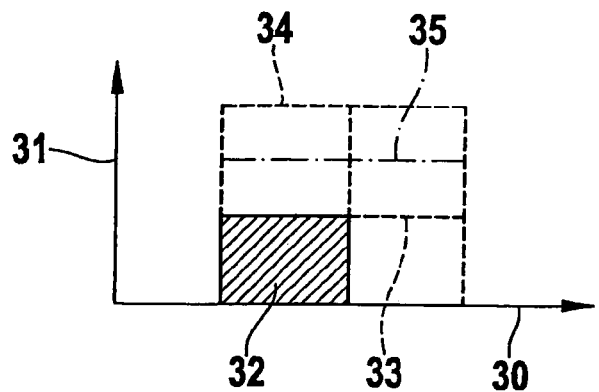
FIG. 3 shows a plurality of exemplary embodiments for a prolongation of, or increase in the amplitude of, the emitted signal.

In FIG. 3, an amplitude of a transmit signal of ultrasonic sensor 3' is plotted over time. The amplitude is plotted on y-axis 31, and the time is plotted on x-axis 30. The hatched area indicates an ultrasonic signal 32 that is used for distance measurements going out from vehicle 1.

A typical transmit time for the reception of object reflections is for example 300 μs. For a test measurement for the detection of the ground surface, for example a lengthening of the transmit pulse to 700 μs would make sense. The same holds for the control voltage of the piezoelement, which in a normal measurement can be 120V, and in a test measurement can be for example 150V.

For the specified transmit duration, in the exemplary embodiment shown here the membrane is excited to vibration for a prespecified time. Startup and decay times of the vibration are not taken into account in the representation according to FIG. 3. In order to ensure a reliable reflection from the ground surface, in a first specific embodiment the transmit signal can be simply lengthened in a manner corresponding to broken line 33. In another specific embodiment, the transmitted signal can also be increased to a higher amplitude 34, corresponding to the broken line. A combination of both of these measures is also possible: the amplitude can be increased and the signal duration lengthened. In particular, the widening of the pulse contributes to better detectability of the echo reflected by the ground. In general, it is the case that a ground echo can be better recognized the longer the pulse lasts and the greater the amplitude is. In many cases, a doubling or tripling of the pulse duration is already sufficient to obtain a reliable reflection of the ground echo. Depending on the location of installation on the vehicle, a corresponding standard value may have to be modified. Thus, for example, the height of the bumper varies according to the vehicle type: in trucks or off-road vehicles, for example, the bumper will be higher than in standard passenger vehicles. Correspondingly, if necessary the pulse duration and/or the magnitude of the amplitude of the transmitted signal in test mode must be adapted to the installation location of the ultrasonic sensor on the vehicle.

In a test measurement, for example, emission does not have to take place with the maximum duration and maximum amplitude, corresponding for example to broken line 34, directly during the first measurement. Thus, it would for example be possible at first to double only the pulse duration in a manner corresponding to dashed line 33. In a next step, the amplitude could be increased by 50%, corresponding to dot-dash line 35. A transmit signal having the maximum amplitude 34 would not be used until a further step. An error message would be outputted only if no ground echo was detected in this case as well.

An error message is outputted for example by control unit 6 to display unit 8. On the display, the driver is then for example shown the message: "Distance measurement device disturbed." A warning tone can also be outputted via loudspeaker 7.

Figure 4:
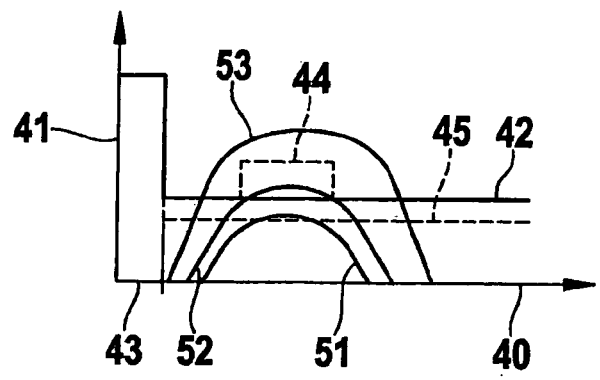
FIG. 4 shows a sensitivity curve of a receiving ultrasonic sensor over time, with recorded envelope curves of received ultrasonic signals from a ground echo.

FIG. 4 shows a receive characteristic for ultrasonic sensors 3, 3'. An amplitude of the envelope curve of the received ultrasonic signal (magnitude of the envelope curve) is plotted on y-axis 41, against time on x-axis 40. A sensitivity curve 42 indicates when a signal reception is detected. If a received signal is situated above sensitivity curve 42, it is detected. If the signal is situated below this curve, no signal is detected. Sensitivity curve 42 is used to enable disturbances caused in particular by noise to be removed by filtering. In a first time interval 43, a dead time is provided so that no disturbances will be caused by the decay characteristic of the ultrasonic sensor. Following this, if warranted the sensitivity can be briefly lowered for measurement operation, corresponding to broken line 44, by increasing the threshold value, in order to exclude ground echoes. In test mode, this lowering is preferably canceled, so that sensitivity curve 42 is used for test mode operation. In another specific embodiment, the sensitivity level conventionally used can also be decreased to a lower level 45 for the measurement for the test mode operation.

As examples, three different reflected ground echo signals are shown in the representation according to FIG. 4. From first signal 51 to second signal 52 to third signal 53, the signals increase in their intensity. First signal 51 is detected only if there is a lowering of the sensitivity level to level 45. Second signal 52 is recognized only if there is a smoothing of the level to a standard value corresponding to sensitivity curve 42. Third signal 53 is strong enough that it always exceeds normal sensitivity level 42. FIG. 4 depicts reflections, which run fairly regularly, of the emitted sound signal. The signal can also have a structure that is irregular throughout due to partly irregular scatter at very small scatter centers. For the determination of whether an incoming signal is received, it is sufficient for a correspondingly prespecified threshold to be exceeded at least one time during the signal reception; this threshold must be sufficiently large to enable separation of an actual reflected signal from a background noise that is always present.

Figure 5:
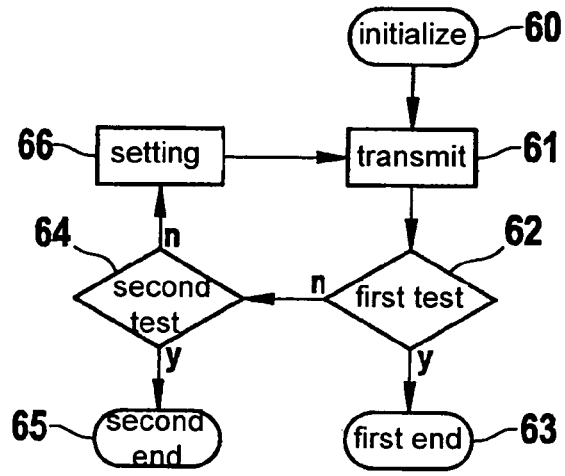
FIG. 5 shows a method sequence according to the present invention.

FIG. 5 shows a method sequence according to the present invention. In an initialization step 60, a test method according to the present invention of an ultrasonic sensor is started. If warranted, the test method can be carried out for a plurality of ultrasonic sensors on a vehicle in succession. In a transmit step 61, an ultrasonic signal is sent out whose duration and/or amplitude is greater than that of a signal used in normal distance measuring operation. In a subsequent first test step 62, it is checked whether the emitted ultrasonic signal was received again. For this purpose, the transmitting sensor and/or other ultrasonic sensors on the vehicle are switched to a receive mode. If, after a time duration that corresponds approximately to the propagation time of a signal to ground surface 20 and back to one of the ultrasonic sensors, an ultrasonic signal is detected, the ground echo has been received. The test method is then terminated in a first end step 63. Here, functioning of the ultrasonic sensor has been established. If warranted, the test method can also be carried out multiple times in succession for one ultrasonic sensor. Preferably, functioning is determined to be present only if the ground echo was also detected in each of the plurality of tests (e.g. three) carried out one after the other.

If in first test step 62 it is determined that the ground echo is not detected, branching takes place to a second test step 64. In second test step 64, it is checked whether the amplitude and/or the duration of the emitted ultrasound signal was already selected large enough that a ground echo would reliably have to have been detected given a properly functioning ultrasonic sensor. If a corresponding maximum was already reached, branching takes place to a second end step 65. In second end step 65, it is determined that a malfunction of the ultrasonic sensor is present. A warning is then correspondingly outputted to a user by control unit 6. If, in contrast, in second test step 64 it is determined that the maximum has not yet been reached, ranching takes place to a setting step 66. In setting step 66, the duration and/or amplitude of the ultrasonic signal is increased corresponding to a prespecified rule. Subsequently, branching takes place back to transmit step 61 by sending out the signal, whose duration and/or amplitude has now again been increased.

What is claimed is:

1. A method for functional testing of an ultrasonic sensor on a motor vehicle, the ultrasonic sensor emitting an ultrasonic signal, and the ultrasonic signal being reflected from a ground surface in front of the vehicle and received again by the ultrasonic sensor or by another ultrasonic sensor, the method comprising:

selecting at least one of a duration and an amplitude of the emitted ultrasonic signal to be great enough to enable, under conventional conditions, a reception of the signal reflected by the ground surface;

determining a functioning of the ultrasonic sensor when there is a reception of the reflected signal; and if no ultrasonic signal reflected by the ground surface is received, increasing at least one of the duration and the amplitude of an ultrasonic signal next emitted, wherein if a value of at least one of the duration and the amplitude has not yet been reached at which, under conventional conditions, a reception of the reflected ultrasonic signal must reliably take place.

2. The method according to claim 1, further comprising evaluating a magnitude of the amplitude of the received signal for the functional test of the ultrasonic sensor.

3. The method according to claim 1, further comprising, in order to detect the signal reflected by the ground surface, increasing a sensitivity of the ultrasonic sensor.

4. A distance-measuring device comprising:

at least one ultrasonic sensor for use in a motor vehicle;

a control unit for initiating an emission of an ultrasonic signal by the ultrasonic sensor in a test operating mode of the ultrasonic sensor, the control unit increasing at least one of an amplitude and a duration of the emitted ultrasonic signal in such a way that the ultrasonic signal that is emitted and reflected by a ground surface in front of the vehicle is capable of being reliably received again, under conventional conditions, by the ultrasonic sensor or by another ultrasonic sensor; and an output unit connected to the control unit for outputting an error for the case in which, after the emission of the ultrasonic signal, it is the case that no signal reflected by the ground surface is received.

* * * * *